(12) United States Patent
Yegorov (10) Patent No.: US 12,083,921 B2
(45) Date of Patent: Sep. 10, 2024

(54) CHARGING VERIFICATION BASED ON MATCHING EVENT DATA TYPES

(71) Applicant: Rivian IP Holdings, LLC, Plymouth, MI (US)

(72) Inventor: Oleksandr Yegorov, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 240 days.

(21) Appl. No.: 17/517,786

(22) Filed: Nov. 3, 2021

(65) Prior Publication Data

US 2023/0133680 A1 May 4, 2023

(51) Int. Cl.
*B60L 53/66* (2019.01)
*B60L 53/30* (2019.01)
*B60L 53/65* (2019.01)
*B60L 53/67* (2019.01)
*B60L 53/68* (2019.01)

(52) U.S. Cl.
CPC .......... *B60L 53/665* (2019.02); *B60L 53/305* (2019.02); *B60L 53/65* (2019.02); *B60L 53/66* (2019.02); *B60L 53/67* (2019.02); *B60L 53/68* (2019.02)

(58) Field of Classification Search
CPC ...... B60L 53/665; B60L 53/305; B60L 53/65; B60L 53/66; B60L 53/67; B60L 53/68
USPC ........................................................ 320/109
See application file for complete search history.

(56) References Cited

U.S. PATENT DOCUMENTS

| | | | | |
|---|---|---|---|---|
| 11,007,892 B2 * | 5/2021 | Metzger | .................. | B60L 53/65 |
| 2015/0306967 A1 * | 10/2015 | Cohen | ..................... | B60L 53/68 |
| | | | | 701/34.2 |
| 2020/0401957 A1 * | 12/2020 | Wild | ....................... | B60L 53/62 |
| 2021/0078434 A1 * | 3/2021 | Goei | ..................... | B60L 53/64 |
| 2021/0213844 A1 * | 7/2021 | Singuru | ............. | H02J 7/00034 |
| 2022/0024335 A1 * | 1/2022 | O'Gorman | ......... | H02J 7/00045 |
| 2023/0141162 A1 * | 5/2023 | Kawashima | .......... | H04L 9/3226 |
| | | | | 701/22 |

FOREIGN PATENT DOCUMENTS

WO WO-2015086745 A1 * 6/2015 ............ B60L 11/182

* cited by examiner

*Primary Examiner* — Richard Isla
*Assistant Examiner* — Manuel Hernandez
(74) *Attorney, Agent, or Firm* — Foley & Lardner LLP (57) ABSTRACT

Various disclosed embodiments include illustrative verification controller units, charging units, and methods. In an illustrative embodiment, a controller unit includes a controller and computer-readable media configured to store computer-executable instructions configured to cause the controller to determine an event data type, receive vehicle event data of a first vehicle, receive charging unit event data of one or more charging units, determine one or more event matches between the vehicle event data of the first vehicle and the charging unit event data of the one or more charging units relative to a threshold, and responsive to determining a unique event match between the vehicle event data of the first vehicle and the charging unit event data of a first charging unit, initiate a charging event of the first vehicle and the first charging unit.

16 Claims, 7 Drawing Sheets

CHARGING VERIFICATION BASED ON MATCHING EVENT DATA TYPES

INTRODUCTION

The present disclosure relates to electric vehicle charging systems. The statements in this section merely provide background information related to the present disclosure and may not constitute prior art.

Before a charging event between a charging unit and a vehicle with rechargeable batteries begins, a method of payment is verified. The vehicle owner enters payment (cash) or payment information (credit/debit card or the like). The charging unit or a backend charging system verifies the entered payment or payment information and then charging begins.

BRIEF SUMMARY

Various disclosed embodiments include illustrative verification controller units, charging units, and methods.

In an illustrative embodiment, a controller unit includes a controller and computer-readable media configured to store computer-executable instructions configured to cause the controller to determine an event data type, receive vehicle event data of a first vehicle, receive charging unit event data of one or more charging units, determine one or more event matches between the vehicle event data of the first vehicle and the charging unit event data of the one or more charging units relative to a threshold, and responsive to determining a unique event match between the vehicle event data of the first vehicle and the charging unit event data of a first charging unit, initiate a charging event of the first vehicle and the first charging unit.

In another illustrative embodiment, a charging unit includes a communication device, power conversion electronics configured to convert grid electrical power to a battery charging current, a controller, and computer-readable media. The computer-readable media is configured to store computer-executable instructions configured to cause the controller to receive a request to begin charging a first vehicle, send event data to an authentication controller unit via the communication device, receive charge determination form the authentication controller unit via the communication device in response to the event data, and initiate charging with the battery load in response the received charge determination indicating a successful authorization.

In another illustrative embodiment, a method includes determining an event data type, receiving vehicle event data of a first vehicle, receiving charging unit event data of one or more charging units, determining one or more event matches between the vehicle event data of the first vehicle and the charging unit event data of the one or more charging units relative to a threshold, and responsive to determining a unique event match between the vehicle event data of the first vehicle and the charging unit event data of a first charging unit, initiating a charging event of the first vehicle and the first charging unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative controller units, charging units, and methods.

Figure 1:
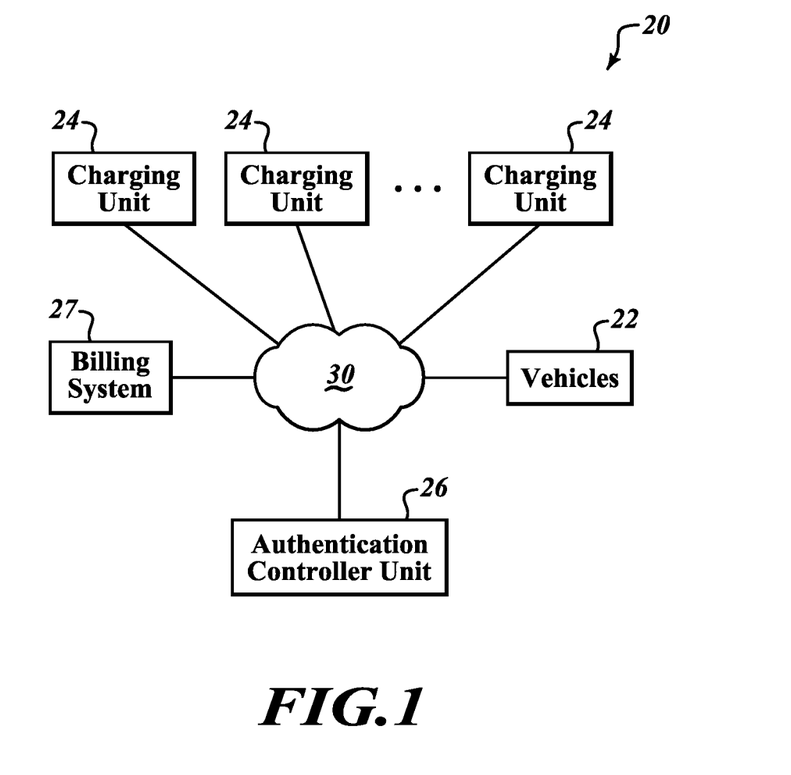
FIG. 1 is a block diagram of a charging authentication system.

Referring to FIG. 1 and given by way of overview, in various embodiments a charging environment 20 includes a data network 30 configured to allow communications between vehicles 22, charging units 24, an authentication controller unit 26, and a billing system 27. The data network 30 may be a public or private data network, such as without limitation a local area network (LAN), a wide area network (WAN), or the like. The authentication controller unit 26 verifies a connection between one of the charging units 24 and one of the vehicles 22. The authentication controller unit 26 instructs the billing system 27 of this connection and authorizes the connected charging unit 24 to begin charging.

Figure 2:
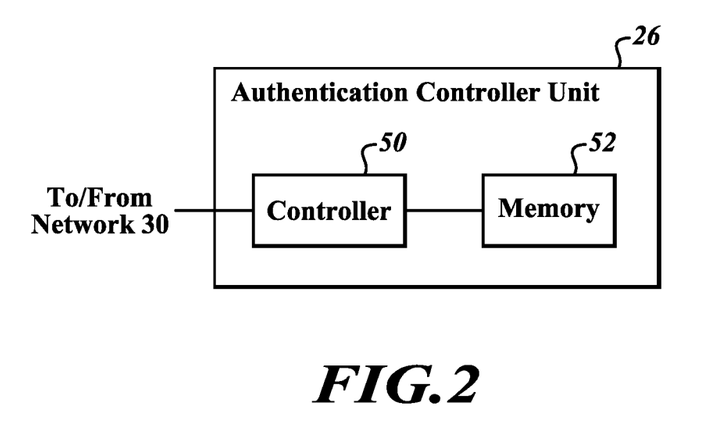
FIG. 2 is a block diagram of components of an authentication controller unit of FIG. 1.

Referring additionally to FIG. 2, in various embodiments the authentication controller unit 26 includes a controller 50 and memory 52. The memory 52 is configured to store computer-executable instructions configured to cause the controller 50 to receive first event data, receive second event data from the vehicle 22, compare the second event data and the first event data to identify a match relative to a first threshold, and initiate a charging event responsive to the comparison indicating a single match. Different types of event data are described in more detail below.

In various embodiments the authentication controller unit 26 may receive the first event data via the data network 30 from the vehicle 22 in response to the vehicle 22 plugging into one of the charging units 24. The authentication controller unit 26 may receive the second event data via the data network 30 from the charging unit 24 or self-generate the second event data. The authentication controller unit 26 compares the first event data to the second event data and initiates a charging event responsive to the comparison indicating a match between the first event data and the second event data associated with just one of the charging units 24. If no match occurs, then the authentication controller unit 26 instructs the charging units 24 or an application program executed on a personal electronics device associated with the operator of the vehicle 22 to request payment information. If multiple matches occur, then other event data is compared until a singular match is found. If no singular match is found, then the authentication controller unit 26 instructs the charging units 24 or an application program executed on a personal electronics device associated with the operator of vehicle 22 to request payment information. Once a single match has been determined, the authentication controller unit 26 initiates a charging event between the matched vehicle 22 and the charging unit 24. The charging event may include sending instructions to the billing system 27 and instructions to the matched charging unit 24 to begin charging and billing functions, respectively.

In various embodiments, authentication controller operations may be performed on the charging unit 24 and authentication controller unit 26 used when the charging unit 24 is offline not in communication with the billing system 27 or the authentication controller unit 26. When the vehicle 22 plugs into the charging unit 24 and withdraws power in a particular charging pattern, the charging unit 24 compares the particular charging pattern with one of many charging patterns previously stored within memory of the charging unit 24. The charging patterns may be various types of patterns. Some patterns may be common to a set of vehicles 22 and charging units 24. Other patterns may be uniquely created for the vehicle 22 and would most likely result in a match with a single charging unit 24.

Figure 3:
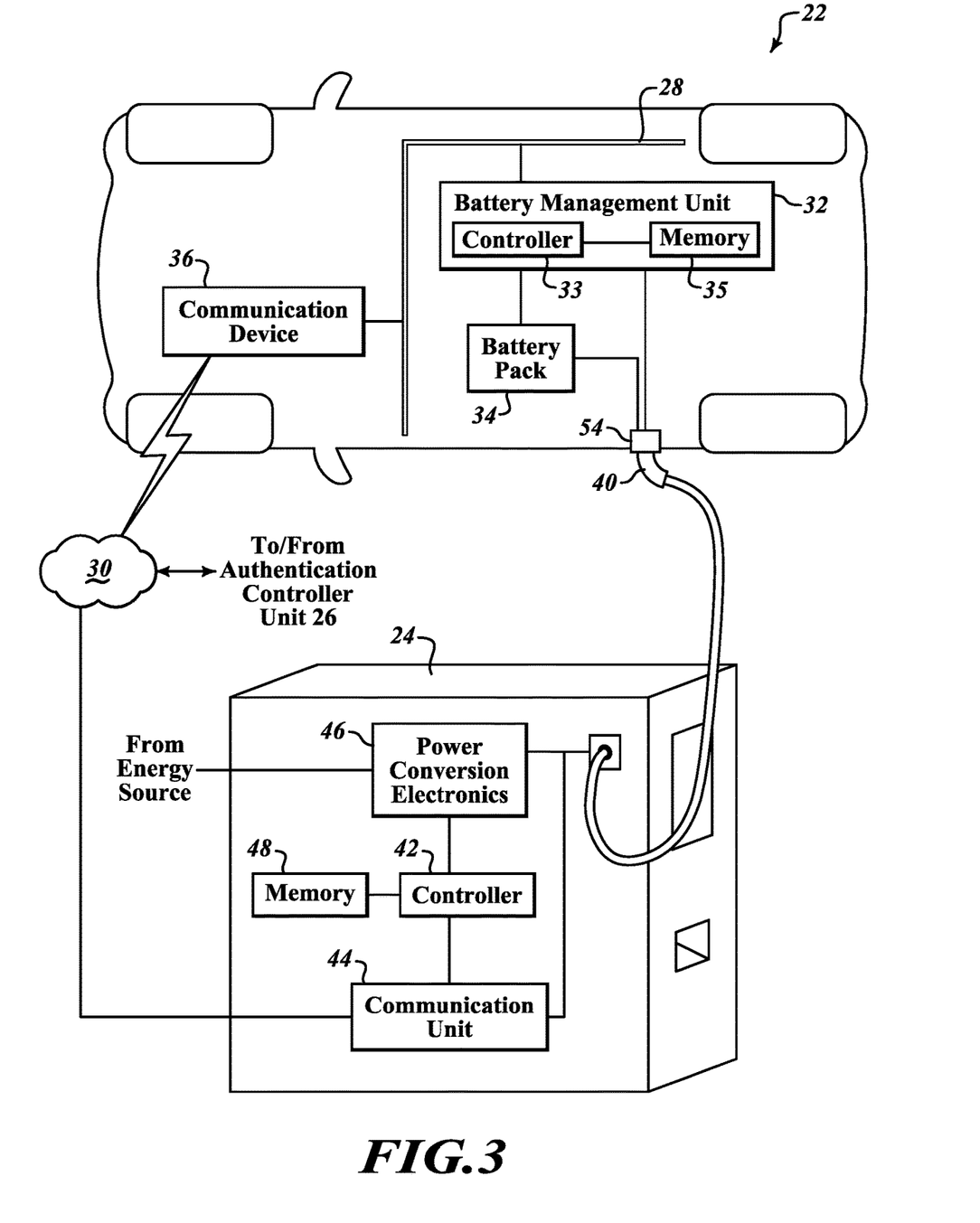
FIG. 3 is a block diagram in partial schematic form of an illustrative DC charging unit.

Referring additionally to FIG. 3, in various embodiments and given by way of overview, the illustrative vehicle 22 includes a battery management unit (BMU) 32, a battery pack 34, a communication device 36, and a charging port 54. In various embodiments the BMU 32 and the communication device 36 may communicate with each other and with numerous other vehicle components via a network 28, such as a network bus, such as a controller area network (CAN) bus. Other network buses, such as a local area network (LAN), a wide area network (WAN), or a value-added network (VAN), may also be used for enabling communication between the components connected to the network 28.

In various embodiments the BMU 32 includes a controller 33 and memory 35. The memory 35 is configured to store computer-executable instructions configured to cause the controller 33 to perform various battery management functions such as, without limitation, assessing battery temperature and state of charge, then identifying a charging current value responsive to the battery temperature and state of charge and a previously-defined charging pattern.

In various embodiments the battery pack 34 may be structured in any desirable form, such as without limitation cylindrical, pouch, prismatic, massless, or other comparable forms. Generally, the battery pack includes Li-ion batteries, such as without limitation Nickel Cobalt Aluminum batteries, Lithium Manganese Cobalt batteries, or Lithium Manganese Oxide batteries. However, other materials may be used for providing comparable recharging, energy density, and energy discharge capabilities.

The communication device 36 may include any suitable wired or wireless device (such as a transceiver or the like) configured to communicate with the data network 30 using various network access devices or methods or protocols, such as, without limitation, a cellular data device, a wireless (WiFi, Bluetooth®) connection with a network portal/modem/router, a wired or wireless connection with a personal electronics device having cellular data connection capabilities, or the like.

In various embodiments the charging port 54 includes power and communication leads that allow for the transmission of instructions between the controller 33 and the charger controller 42 in accordance with a communication protocol, such as, without limitation, a Combined Charging System (CCS) protocol, a CHAdeMO protocol, SAE J1772 protocol, or other charger protocols.

In various embodiments the charging port 54 also provides a data communication connection between the controller 33 of the BMU 32 and the charging unit 24 and an electrical power connection between the battery pack 34 and the charging unit 24. The battery pack 34 is in communication with the BMU 32.

In various embodiments, the illustrative charging unit 24 may include any suitable electrical charger, charging device, or charging system, such as, without limitation, a class II charger, a direct current fast charging device, or other Electric Vehicle Supply Equipment (EVSE), as desired for a particular application. The charging unit 24 is connected to an energy source (alternating current (AC) or direct current (DC)) and includes a connector 40 for attaching to vehicles 22 via the charging port 54 or to comparable battery load devices, such as, without limitation, portable rechargeable battery packs or backup power systems. Those skilled in the art will appreciate that the energy source may provide electrical power from a variety of different sources, such as energy storages devices (electrochemical batteries, gravity batteries, or the like), power plant, wind turbine, solar cell, geothermal, or any mechanism that can produce electrical power.

In various embodiments the charging unit 24 may include power conversion electronics 46, a controller 42, a communication unit 44, and memory 48 (computer-readable media). The power conversion electronics 46, as controlled by the controller 42 executing instruction stored in the memory 48, receives AC power from a grid energy source and converts the AC power to DC power that is delivered to the vehicle 22 via the connector 40. The controller 42 may receive and/or transmit instructions or data from/to the vehicle 22 via the communication unit 44. The communication unit 44 may also communicate with the data network 30 using various network access devices, such as, without limitation, via a wired network address, a cellular data connection, or the like.

As discussed herein, in various embodiments the controllers 33, 42, and 50 suitably may include computer processors, data processors, or the like, that are configured to execute instructions received from external sources or stored in local memory 36, 48, and 52.

As discussed herein, in various embodiments the memory 36, 48, and 52 include non-transitory computer-readable storage medium that include computer-readable code (instructions) stored thereon for causing the respective controllers 33, 42, and 50 to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include the instructions executable by the respective controllers 33, 42, and 50 that, in response to such execution, causes performance of a set of operations, steps, methods, processes, algorithms, functions, techniques, etc. as described herein for the various embodiments.

In various embodiments the memory 52 is configured to store computer-executable instructions configured to cause the controller 50 to receive first event data, receive second event data from the vehicle 22, compare the second event data and the first event data to identify a match relative to a first threshold, and initiate a charging event responsive to the comparison indicating a single match.

In various embodiments the first threshold includes a threshold interval of time. The first event data sent from a plurality of the charging units 24 includes a first connection time between each of the plurality of charging units 24 and an associated vehicle 22. The second event data sent from the vehicle 22 includes a second connection time between the vehicle 22 and one of the plurality of charging units 24. Thus, the controller 50 compares the connection times of the charging units 24 to the connection time of the vehicle 22. The controller 50 determines a match between the vehicle 22 and the charging units 24 responsive to a time difference between the connection times being less than the threshold interval of time.

In various embodiments the first threshold includes a threshold distance value. The first event data sent from a plurality of the charging units 24 includes first location information associated with the plurality of charging units 24. The second event data sent from the vehicle 22 includes second location information associated with the vehicle 22. Thus, the controller 50 compares the second location information to the first location information. The controller 50 determines a match between the vehicle 22 and the charging units 24 responsive to the first location information being within the threshold distance value from the second location information.

In various embodiments the computer-executable instructions are further configured to cause the controller 50 to send a previously-defined charging pattern to a device chosen from the vehicle 22 and/or the plurality of charging units 24. The first threshold includes a pattern matching threshold. The first event data includes the sent previously-defined charging pattern. The previously-defined charging pattern causes the charging unit 24 to provide to the vehicle 22 a specific pattern of changing charging current or voltage over a short period of time (such as, without limitation, around 5-100 ms or so). The specific pattern of charging and time length of the charging pattern are chosen as to not significantly affect, such as overheat, the battery pack 34 during charging. The BMU 32 receives the power supplied by the charging unit 24 that is sending a charge in accordance with the previously-defined charging pattern. The second event data includes an observed charging pattern or a charging pattern the BMU 32 is implementing or has implemented. The BMU 32 sends the recorded/observed/implemented charging pattern to the authentication controller unit 26 via the communication device 36. Thus, the controller 50 compares the previously-defined charging pattern sent by the controller 50 to the charging pattern recorded/observed/implemented by the BMU 32. The controller 50 determines a match between the vehicle 22 and the charging units 24 responsive to the previously-defined charging pattern sent by the controller 50 and the charging pattern recorded/observed/implemented by the BMU 32 passing a pattern matching threshold. Pattern matching comparisons are well known in the art and no further explanation is necessary for a person of skill in the art to understand disclosed subject matter.

In various embodiments the computer-executable instructions are further configured to cause the controller to receive and compare a second set of event data (third event data and fourth event data) responsive to the comparison of a first set of event data (first event data and second event data) indicating more than a single match between the first event data and the second event data.

In various embodiments the computer-executable instructions are further configured to cause the controller to receive and compare a third set of event data (fifth event data and sixth event data) responsive to the comparison of the second set of event data indicating more than a single match between the third event data and the fourth event data.

In various embodiments, the first, second, and third sets of event data may be any of the previously described types of event data or any event data that may help to identify a link between the vehicle 22 and one of the charging units 24 without the need of asking for more information, such as, without limitations, payment information, from the operator of the vehicle 22.

Figure 4:
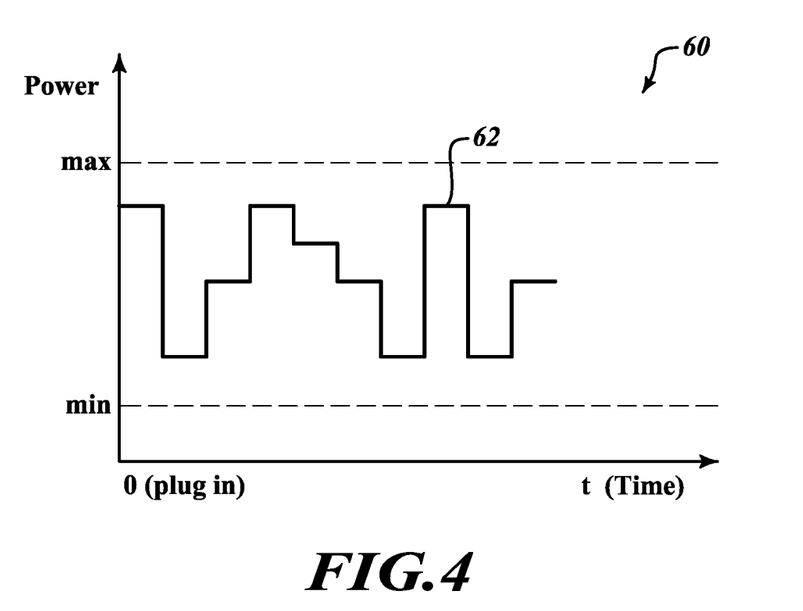
FIG. 4 is a graph of an illustrative charging pattern.

Referring additionally to FIG. 4, a graph 60 includes an illustrative charging pattern 62. The charging pattern 62 defines a varying power (e.g., in watts) value between a maximum power value and a minimum power value. The charging pattern 62 may include a varying current or voltage values.

Figure 5:
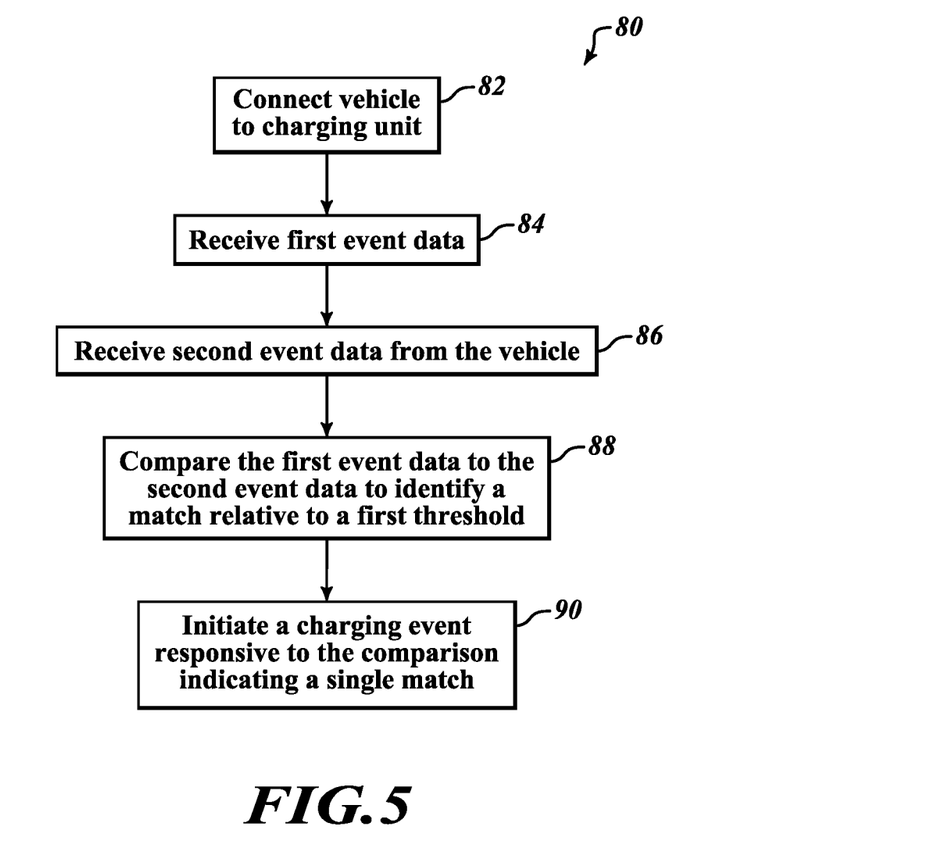
FIG. 5 is a flow chart of an illustrative method for performing charging authentication.

Referring additionally to FIG. 5, in various embodiments an illustrative method 80 is provided for verifying a vehicle and charging unit pairing for billing operations. It will be appreciated that, in some embodiments, the method 80 may be suited for being performed by a controller module and/or a controller executing instruction stored in a memory. At a block 82, a vehicle is connected to a charging unit. At a block 84, first event data is received at a controller unit. At a block 86, second event data is received at the controller unit from the vehicle. At a block 88, the second event data is compared to the first event data to identify a match relative to a first threshold. At a block 90, a charging event is initiated responsive to the comparison indicating a single match.

In some embodiments, the first threshold includes an interval of time. The first event data includes a first connection time between each of the plurality of charging units and an associated vehicle. The second event data includes a second connection time between the vehicle and one of the plurality of charging units.

In some embodiments, the first threshold includes a distance value. The first event data includes first location information associated with the plurality of charging. The second event data includes second location information associated with the vehicle.

In some embodiments, a previously-defined charging pattern is sent to a device chosen from the vehicle and the plurality of charging units. The first threshold includes a pattern matching threshold. The first event data includes the previously-defined charging pattern. The second event data includes an observed charging pattern received from the vehicle.

In some embodiments, responsive to the comparison indicating more than a single match third event data is received from the vehicle, fourth event data is received from a subset of the plurality of charging units having first connection time identified as a match with the second connection time relative to the first threshold, and the third event data and the fourth event data are compared to identify a match relative to a second threshold. A charging event is initiated responsive to the comparison between the third event data and the fourth event data indicating a single match.

In some embodiments, the second threshold further includes a distance value. The third event data includes first location information associated with the plurality of charging units. The fourth event data includes second location information associated with the vehicle.

In some embodiments, a previously-defined charging pattern is sent to a device chosen from the vehicle and the subset of the plurality of charging units. The second threshold includes a pattern matching threshold. The fourth event data includes the previously-defined charging pattern. The third event data includes an observed charging pattern received from the vehicle.

In some embodiments, responsive to the comparison of the first location information and the second location information indicating more than a single match a previously-defined charging pattern is sent to a device chosen from the vehicle and the plurality of charging units having the second location information identified as a match with the first location information relative to the distance value; an observed charging pattern is received from the vehicle; and the sent previously-defined charging patterns and the observed charging pattern are compared to identify a match relative to a pattern matching threshold. A charging event is initiated responsive to the comparison indicating a single match.

Figure 6:
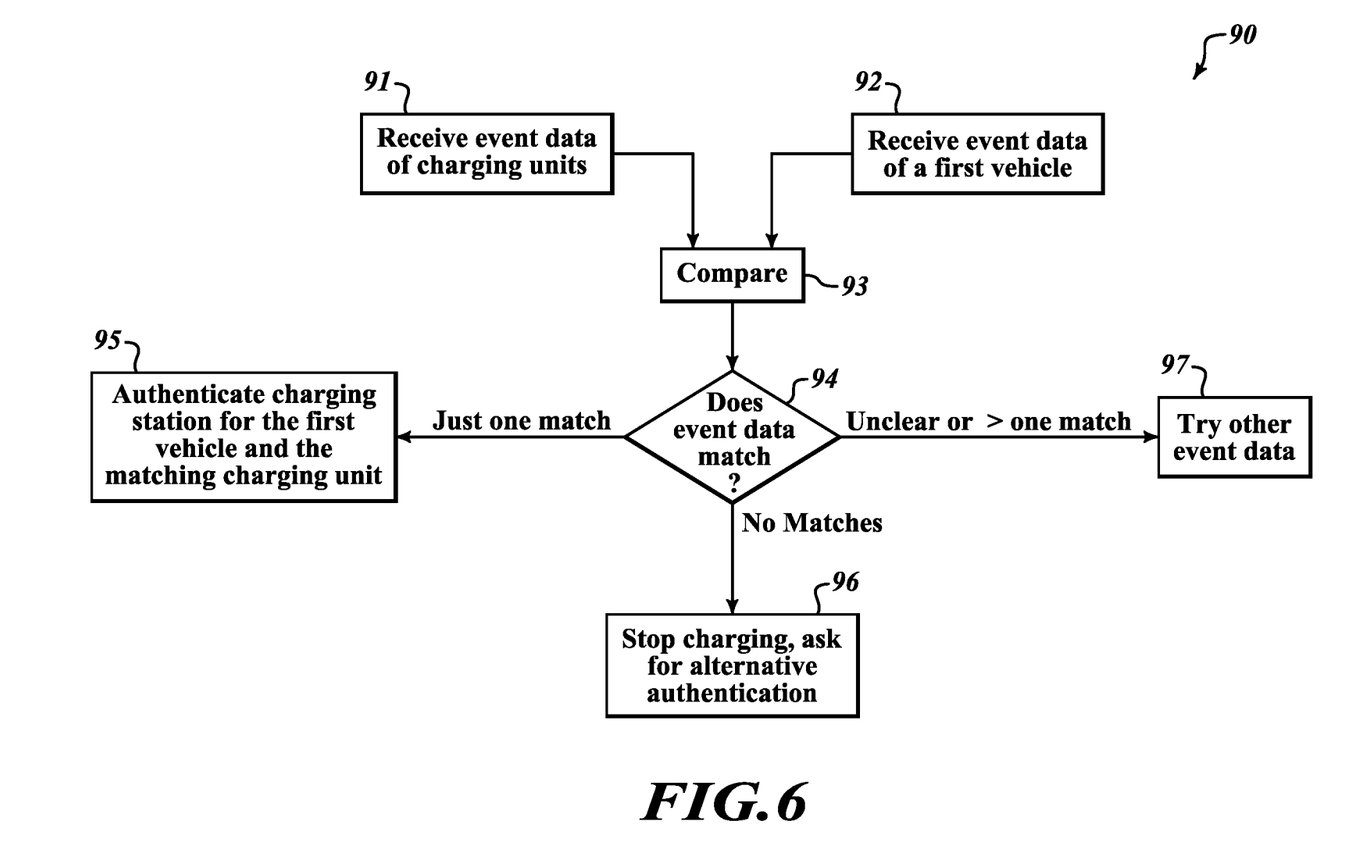
FIG. 6 is a flow chart of an illustrative method for performing charging authentication.

Referring additionally to FIG. 6, in various embodiments an illustrative method 90 is provided for verifying a vehicle and charging unit pairing for billing operations. It will be appreciated that, in some embodiments, the method 90 may be suited for being performed by a controller module and/or a controller executing instruction stored in a memory. At a block 91, event data associated with multiple charging units is received at an authentication device. At a block 92, event data of a first vehicle that is plugged into one of the charging units is received at the authentication device. At a block 93, the received event data is compared to determine if a match occurs relative to a related threshold value. At a block 94, one of three event data match outcomes may be determined—just one match, unclear or >1 match, no matches. At a block 95, responsive to just one match being identified, the charging unit with the matching event data to the event data of the first vehicle is authenticated and charging begins. At a block 96, charging is stopped, responsive to no event data matches occurring. At a block 97, the comparison process repeats (iterative) with other event data (i.e., another event data type), responsive to the event data comparison resulting in an unclear or a >1 match. In various examples, event data types may include plug-in time, location, and/or charging pattern.

Figure 7:
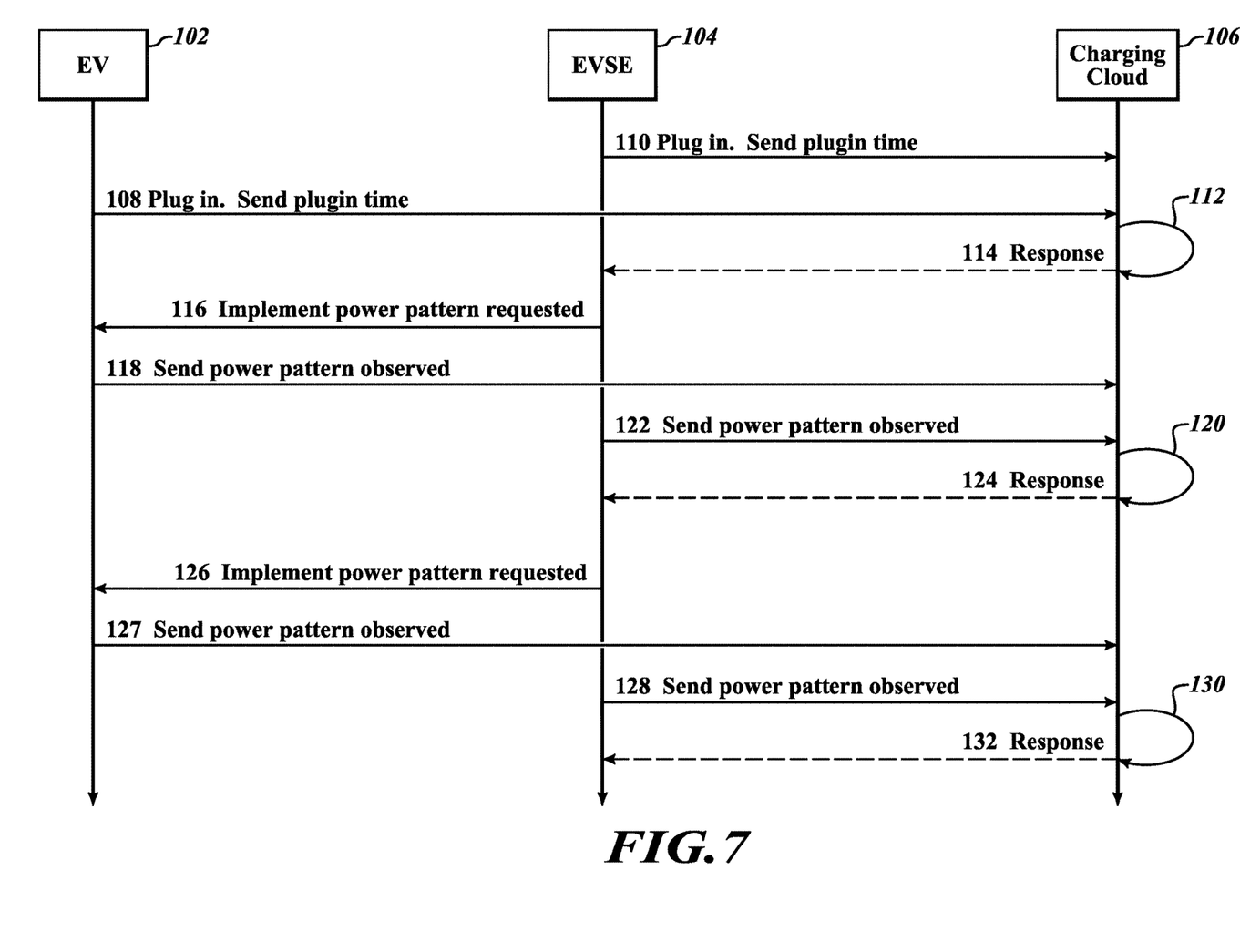
FIG. 7 is an action diagram of actions performed by the components of the system of FIG. 1.

Referring additionally to FIG. 7, in various embodiments an illustrative action diagram 100 is provided for verifying a vehicle and charging unit pairing for billing operations. It will be appreciated that, in some embodiments, actions in the action diagram 100 may be suited for being performed by an electric vehicle (EV) 102, an EVSE 104 and/or a charging cloud (server) 106.

At an action 108, the EV 102 plugs into the EVSE 104, thus causing the EV 102 to send to the charging cloud 106 the time (plug-in time) at which the EV 102 plugged into the EVSE 104. When the EVSE 104 receives a plug-in from the EV 102, the EVSE 104 sends the time of plug-in to the charging cloud 106. The charging cloud 106 checks at particular intervals of time to determine if there exists a received time of plug-in from any EV 102 and a received time a plug-in from any EVSE 104.

At action 112, the charging cloud 106 determines based on the received information within the time interval whether a match occurs between the EV 102 and the EVSE 104. If a time interval only includes the plug-in times from a single EV 102 and a single EVSE 104, then a match is determined and a response, at action 114, includes authorization to the EVSE 104 to continue charging the EV 102. If no pairs of plug-in times were received by the charging cloud 106, the response, at action 114, includes a stop charging command and a request for other authentication information.

If plug-in times from either multiple EVs 102 and/or multiple EVSEs 104 were received at the time interval, then it is unclear whether a match exists, thus prompting the response, at action 114, to include a further action request. The further action request may include, at action 116, a request sent to the EVSE(s) 104 of the unclear determination to start charging with a fist type of charging power pattern.

At action 118, the EV 102 observes the charging power pattern applied thereto and sends the observed charging power pattern back to the charging cloud 106. At action 120, the charging cloud 106 determines based on the observed charging power pattern and the fist type of charging power pattern whether a match occurs between the EV 102 and the EVSE 104. If the observed charging power pattern and the fist type of charging power pattern match, then a match is determined and a response, at action 124, includes authorization to the EVSE 104 to continue charging the EV 102.

If no matching pairs of the observed charging power pattern and the fist type of charging power pattern exist, then the response, at action 124, includes a stop charging command and a request for other authentication information. If the observed charging power pattern(s) and the fist type of charging power pattern(s) from either multiple EVs 102 and/or multiple EVSEs 104 indicate a match, then it is unclear whether a match exists, thus prompting the response, at action 124, to include a second further action request. The second further action request may include a request sent to the EVSE(s) 104 of the multiple matches of action 120 to start charging with a second type of charging power pattern or power value.

At action 126, the EVSE(s) 104 of the multiple matches of action 120 start charging the EVs 102 connected to them with the requested second type of charging power pattern. At action 127, the EV 102 observes the charging power pattern applied thereto and sends the observed charging power pattern back to the charging cloud 106.

At action 130, the charging cloud 106 determines based on the observed charging power pattern and the second type of charging power pattern whether a match occurs between the EV 102 and the EVSE 104. If the observed charging power pattern and the second type of charging power pattern match, then a match is determined and a response, at action 132, includes authorization to the EVSE 104 to continue charging the EV 102. If no matching pairs or multiple matching pairs of observed charging power pattern and the second type of charging power pattern exist, then the response, at action 132, includes a stop charging command and a request for other authentication information.

By way of a non-limiting example, if there are 100 EVSEs and 100 EVs plugged in at the same time, the 100 EVSEs and EVs need to be narrowed down to determine a match between one of the EV and one of the EVSEs. The system may calculate different patterns different enough to recognize a subset of EV-EVSE pairs. Each of these patterns has a different single (power) value. One subset of 100 EVs and 100 EVSEs that plugged in at the same time would be instructed to apply a charging pattern at a first power value. A second 100 subset of 100 EVs and 100 EVSEs that plugged in at the same time would be instructed to apply a charging pattern at a second power value, and so on. As a result, one of the subsets should produce a match. To then find a match of a particular one of the EVs and the matching EVSEs in the matching subset, a more detailed charging pattern may be used, such as that described above with regard to FIG. 4.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A controller unit comprising:
    a controller; and
    computer-readable media configured to store computer-executable instructions configured to cause the controller to perform a process to:
        identify a first event data type;
        receive a first vehicle event data of the first event data type of a vehicle;
        receive a first charging unit event data of the first event data type of a plurality of charging units;
        determine, relative to a first threshold, a plurality of event matches between the first vehicle event data of the vehicle and the first charging unit event data of the plurality of charging units;
        responsive to the determination of the plurality of event matches, initiate a comparison, relative to a second threshold, of a second vehicle event data of a second event data type comprising a charging pattern of the vehicle and a second charging unit event data of the second event data type comprising a plurality of charging patterns of the plurality charging units; and
        responsive to determination of a unique event match between the second vehicle event data of the vehicle and the second charging unit event data of a charging unit of the plurality of charging units, initiate a charging event of the vehicle and the charging unit to convert, via power conversion electronics, grid electrical power to a battery charging current for the battery of the vehicle;
    wherein:
        the determined first event data type includes a charging pattern different than the charging pattern of the second event data type;
        the first vehicle event data of the vehicle includes the charging pattern of the first event data type sent from the vehicle to a respective charging unit;
        the first charging unit event data of the plurality of charging units includes one or more observed charging patterns from one or more vehicles plugged into respective charging units; and the first threshold includes a pattern matching threshold.

2. The controller of claim 1, wherein the computer-executable instructions are further configured to cause the controller to:

generate the charging pattern of the second event data type
for the vehicle; and send the charging pattern of the second event
data type to the vehicle.

3. The controller of claim 2, wherein the charging pattern of the second event data type for the vehicle includes a plurality of values at predefined intervals of time across a predefined pattern range.

4. The controller unit of claim 1, wherein the computer-executable instructions are further configured to cause the controller to perform the process in an iterative manner; and the second event data type is selected from one of event types different than the first event data type.

5. The controller unit of claim 4, wherein the computer-executable instructions are further configured to cause the controller to:

generate the charging pattern of the second event data type for the vehicle; and send the charging pattern of the second event data type to the vehicle.

6. The controller unit of claim 4, wherein the computer-executable instructions are further configured to cause the controller to:

responsive to no event matches between the second vehicle event data of the vehicle and the second charging unit event data of the plurality of charging units relative to the threshold, stop performing the process and prompt a user for authentication information.

7. A method, comprising:

identifying a first event data type;

receiving a first vehicle event data of the first event data type of a vehicle;

receiving a first charging unit event data of the first event data type of a plurality of charging units;

determining, relative to a first threshold, a plurality of event matches between the first vehicle event data of the vehicle and the first charging unit event data of the plurality of charging units;

initiating, relative to a second threshold and responsive to the determining of the plurality of event matches, a comparison of a second vehicle event data of a second event data type comprising a charging pattern of the vehicle and a second charging unit event data of the second event data type comprising a plurality of charging patterns of the plurality of charging units;

responsive to determining a unique event match between the second vehicle event data of the vehicle and the second charging unit event data of a charging unit, initiating a charging event of the vehicle and the charging unit to convert, via power conversion electronics, grid electrical power to a battery charging current for the battery of the vehicle;

the determined first event data type includes a charging pattern different than the charging pattern of the second event data type;

the first vehicle event data of the vehicle includes the charging pattern of the first event data type sent from the vehicle to a respective charging unit;

the first charging unit event data of the plurality of charging units includes one or more observed charging patterns from one or more vehicles plugged into respective charging units; and the first threshold includes a pattern matching threshold.

8. The method of claim 7, further comprising:

generating the charging pattern of the second event data type for the vehicle; and sending the charging pattern of the second event data type to the vehicle.

9. The method of claim 8, wherein the charging pattern of the second event data type for the vehicle includes a plurality of values at predefined intervals of time across a predefined pattern range.

10. The method of claim 7, further comprising:

iteratively performing determining of the first event data type, receiving the first vehicle event data of the vehicle, receiving the first charging unit event data of the plurality of charging units, and determining the plurality of event matches between the first vehicle event data of the vehicle and the first charging unit event data of the plurality of charging units relative to the first threshold
and
for a next iteration, the second event data type is selected from one of event data types different than the first event data type.

11. The method of claim 10, wherein the computer-executable instructions are further configured to cause the controller to:

generate the charging pattern of the second event data type
for the vehicle; and send the charging pattern of the second event
data type to the first vehicle.

12. The method of claim 10, further comprising:

responsive to no event matches between the second vehicle event data of the vehicle and the second charging unit event data of the plurality of charging units relative to the second threshold, stopping authentication and prompting a user for authentication information.

13. A charging unit, comprising:

a communication device;

power conversion electronics configured to convert grid electrical power to a battery charging current;

a controller; and computer-readable media configured to store computer-executable instructions configured to cause the controller to perform a process to:

receive a request to begin charging a vehicle;

send a first charge unit event data of a first event data type to an authentication controller unit via the communication device;

receive a first charge determination from the authentication controller unit via the communication device in response to the first charge unit event data, the first charge determination indicating a plurality of event matches, according to a first threshold, between a first vehicle event data of the vehicle and the first charge unit event data;

send, responsive to the first charge determination, a second charge unit event data of a second event data type to the authentication controller unit via the communication device;

receive a second charge determination, according to a second threshold, from the authentication controller unit via the communication device in response to a unique event match between the second charge unit event data and a second vehicle event data of the second event data type comprising a charging pattern; and initiate charging with a battery load in response to the received second charge determination indicating a successful authorization;

wherein:
    the first event data type includes a charging pattern different than the charging pattern of the second event data type;
    the charging pattern of the first event data type is sent from the vehicle to a respective charging unit;
    the first charge unit event data includes one or more observed charging patterns from one or more vehicles plugged into respective charging units; and
    the first threshold includes a pattern matching threshold.

14. The charging unit of claim 13, wherein the first charge unit event data includes time of connection with a vehicle.

15. The charging unit of claim 13, wherein the first charge unit event data includes location information associated with the charging unit.

16. The charging unit of claim 13, wherein the computer-executable instructions are further configured to cause the controller to:

receive the charging pattern of the second event data type that is previously defined; and instruct the power conversion electronics in response to the charging pattern of the second event data type.

\* \* \* \* \*